United States Patent [19]

Gehman et al.

[11] 4,017,662
[45] Apr. 12, 1977

[54] POLISHING METHOD

[75] Inventors: David R. Gehman, Harleysville, Pa.; Irwin S. Fiarman, Willingboro, N.J.

[73] Assignee: Rohm and Haas Company, Philadelphia, Pa.

[22] Filed: Jan. 24, 1972

[21] Appl. No.: 220,394

Related U.S. Application Data

[63] Continuation-in-part of Ser. No. 686,709, Nov. 29, 1967, abandoned, and Ser. No. 771,703, Oct. 30, 1968, abandoned.

[52] U.S. Cl. .......................... 428/443; 260/28.5 R; 427/385 B; 427/385 C; 427/393; 428/456; 428/484; 428/515; 526/327

[51] Int. Cl.² .................... B05D 3/02; B32B 19/04; B32B 9/04; B32B 27/08

[58] Field of Search ........... 117/138.8 UT, 161 UC; 106/3, 10; 260/86.1 E, 28.5 R; 427/385 B, 385 C, 393; 428/443, 456, 484, 515; 526/327

[56] References Cited

UNITED STATES PATENTS

| 2,606,165 | 8/1952 | Chapin | 260/28.5 A |
|---|---|---|---|
| 3,311,583 | 3/1967 | Bearden | 260/29.6 TA |
| 3,328,325 | 6/1967 | Zdanowski | 260/28.5 |
| 3,347,811 | 10/1967 | Bissot | 260/29.6 H |
| 3,352,806 | 11/1967 | Hicks | 260/33.4 |
| 3,403,119 | 9/1968 | Sullivan et al. | 260/28.5 |
| 3,405,084 | 10/1968 | Bohac | 260/29.6 TA |
| 3,412,059 | 11/1968 | Stickelmeyer | 260/29.6 TA |
| 3,429,842 | 2/1969 | Wolstoncroft | 260/28.5 |
| 3,457,208 | 7/1969 | Sullivan et al. | 260/28.5 |

Primary Examiner—Michael R. Lusignan

[57] ABSTRACT

This invention relates to essentially water-clear aqueous coating compositions, particularly floor polishing compositions, containing a highly hydrophilic addition copolymer of low molecular weight, a water miscible organic coalescing agent or plasticizer and, as optional components, a polyvalent metal compound, an alkali-soluble resin and a wax, with or without a wax-soluble resin. Methods of using the composition and articles containing transparent coatings derived from such compositions are also included in the invention. The compositions of this invention, when formulated with such desirable additives as wetting agents and leveling agents and adjusted to a final alkaline pH of between 7.0 to about 10 or more, are essentially water-clear or substantially clarified solutions that, after application to a substrate, dry to form clear exceptionally glossy coatings, the glossiness being markedly higher than with known polish compositions, and removal of polish coatings using alkaline or detergent solutions being effected more easily than with prior polishes.

16 Claims, 3 Drawing Figures

EFFECT OF MOLECULAR WEIGHT ON GLOSS

POLISHING METHOD

This application is a continuation-in-part of applications Ser. No. 686,709, filed Nov. 29, 1967, now abandoned and Ser. No. 771,703, filed Oct. 30, 1968, now abandoned.

SPECIFICATION AND DETAILED DESCRIPTION OF THE INVENTION

It is known to employ, as a floor polish, a composition containing an aqueous polymeric dispersion of a water-insoluble emulsion copolymer, and such compositions are described in U.S. Pat. No. 3,328,325 to Zdanowski. Various other polishing compositions and coating compositions are known that contain a water-insoluble emulsion copolymer, for example U.S. Pat. No. 2,754,286 and 2,971,934 to Brown et al. and U.S. Pat. No. 3,308,078 to Rogers et al. These copolymers are usually milky-white in appearance and a finally formulated alkaline polishing composition is commonly a turbid suspension even though the applied polish dries to form a clear film. It is possible to provide essentially water-clear compositions of polymers of the types disclosed in the patents noted above, but they may be deficient in certain properties including gloss.

Heretofore it has been found that low molecular weight acrylic and similar polymers such as the styrene-maleic anhydride copolymer described in U.S. Pat. No. 2,606,891 to Rowland, having a high free acid or carboxylic group content are unsatisfactory when used as the major polymeric constituent in aqueous floor polishes. The defects include water spotting, redispersion problems in applying subsequent coats, and poor wear qualities. Although the metal cross-linked polishes described in the above-identified patents provide excellent polishes, the gloss thereof is not as high as might be desired, particularly on porous substrates such as linoleum.

It is a principal object of this invention to provide polishing compositions that are essentially water-clear solutions. It is an additional object of this invention to provide a polishing composition that produces a clear dry film having an advantageous balance of properties which include recoatability, wear resistance, film hardness, good removability properties, and of particular importance, an exceptionally high gloss.

It has now been found that polymers having a critical range of low molecular weights, as evidenced by intrinsic viscosity, and a critical range of high content of $\alpha,\beta$-unsaturated carboxylic acids, utilized in polish formulations similar to those described in the above-noted patents, provide an outstanding gloss improvement and improved removability. This result is obtained without sacrificing, to a serious extent, if at all, resistance to powdering, slip resistance, recoatability, resistance to migration of plasticizers in floor tiles, clarity of aqueous polishes, film integrity, resistance to yellowing, stable coating transparency, flow and leveling properties, dirt pick-up resistance, storage stability, freeze-thaw stability, scuff resistance, wearability, water and water spotting resistance, film forming temperature, and gloss retention.

The polishing compositions of the present invention can generally be defined in terms of the following proportions of the main constituents:

| Constituent: | Proportion |
|---|---|
| (A) Addition polymer having an intrinsic viscosity of 0.05 to 0.15 and including at least about 12% by weight of $\alpha,\beta$-unsaturated acid monomer | 30–100 parts by weight. |
| (B) Coalescing agent or plasticizer | 3–75 parts by weight of A+C. |
| (C) Wax, wax-soluble, and/or alkali-soluble resin | 0–70 parts of each by weight (A+C = 100). |
| (D) Wetting, emulsifying and dispersing agents | 0–30% on weight of A+C. |
| (E) Equivalents of metal ion | 0 to 0.5/equivalent of —COOH. |
| (F) Water | To make total solids of 8% to 45%. |

For a non-buffable (i.e., bright-drying or self-polishing) composition, the wax should be not over 20 parts by weight, preferably 0 to 15 parts by weight in 100 parts total of polymer plus wax according to the formulation of the above table. Satisfactory non-buffable floor polish formulations have been prepared without the inclusion of a wax. Thus wax is not an essential component of a self-polishing composition. For a mechanically buffable polish composition, the wax should be at least 20, preferably at least 35 parts by weight on such total.

Figure 1:
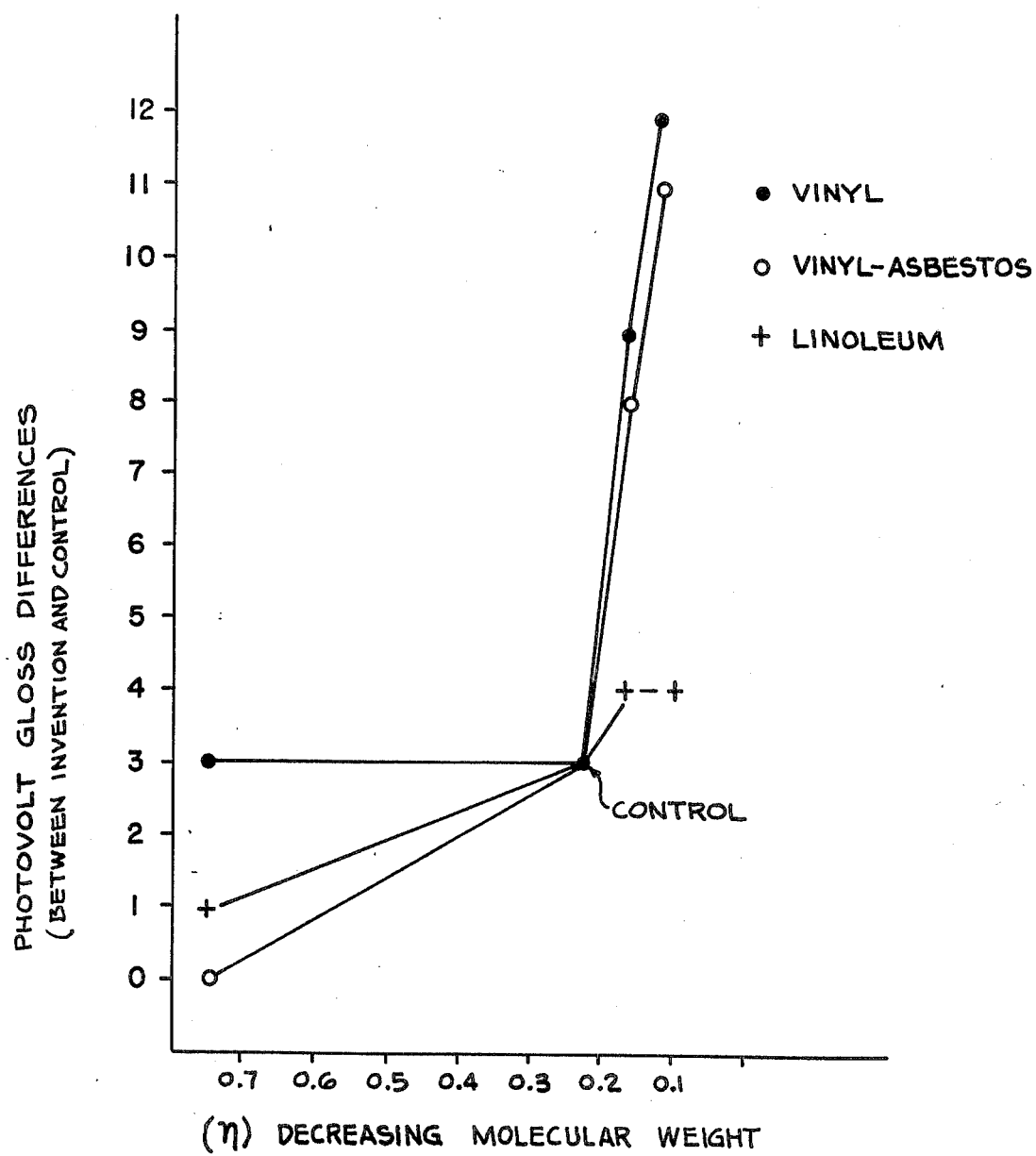
FIG. 1, shows the increasing gloss with decreasing molecular weight.

The polymer obtainable by emulsion polymerization or by solution polymerization employed in the compositions of the present invention should provide a hardness such that the composition containing it deposits a film having, or developing upon aging, a Knoop hardness (KHN) of at least 0.5 and preferably from about 1.2 to 16 or greater when measured on a film of 0.5 to 2.5 mil thickness on a glass panel, although in some uses such as low traffic floor polishes and furniture polishes this value may be as low as about 0.3. The copolymer should also have a minimum film forming temperatures (MFT) of less than about 85° C. and preferably less that about 80° C. The addition polymer must have an intrinsic viscosity (in tetrahydrofuran at 30° C.) of from 0.05 to 0.15 dl/g., and the monomers from which it is prepared must comprise a certain proportion of an $\alpha,\beta$-unsaturated carboxylic acid such as methacrylic acid. The amount of such acid is critical, preferably 18% to 25% by weight of the monomers, although as little as 12% and as much as 50% may be used. Other hydrophilic monomers than the acids may be present, suitably in amounts of up to about 25% of the total monomers.

The polymer may be obtained by emulsion copolymerization of at least one hydrophilic monoethylenically α,β-unsaturated carboxylic acid monomer and at least one hydrophobic monoethylenically unsaturated monomer such as esters of acrylic or methacrylic acid wherein the alcohol moiety of the ester is derived from benzyl alcohol, phenol, or a saturated monohydric aliphatic alcohol, especially an alkanol, having 1 to 18 carbon atoms, such as cyclopentanol, cyclohexanol, methanol, ethanol, n-propanol, isopropanol, n-butanol, isobutanol, sec-butanol, tert-butanol, any of the pentanols, hexanols, octanols, decanols, dodecanols, hexadecanols and octadecanols. Preferred acrylic esters are esters of the lower alkanols having 1–8 carbon atoms, and include methyl acrylate, ethyl acrylate, butyl acrylate, 2-ethylhexyl acrylate, ethyl methacrylate, exceptional results having been obtained with methyl methacrylate and butyl methacrylate. When emulsion polymerization is utilized, the level of concentration of chain transfer agent and other polymerization conditions must be such that the specified intrinsic viscosity is obtained.

In lieu of emulsion polymerization, solution polymerization procedures, utilizing certain oxygenated water-miscible solvents in low concentration, with high reaction temperatures, are useful to provide polymers of the required inherent viscosity and low molecular weight. These solvents are discussed below in connection with their use as fugitive plasticizers. Yet another method of obtaining the required low molecular weight polymers comprising the α,β-unsaturated carboxylic acid is to use a higher concentration of free radical initiator in an emulsion polymerization method. For example, using 4–5%, based on monomer weight of ammonium persulfate, good results are obtained.

The hydrophilic monoethylenically unsaturated monomers include α-β-monoethylenically unsaturated acids such as acrylic, methacrylic, maleic, fumaric aconitic, crotonic or itaconic with the monocarboxylic acids, particularly methacrylic acid, being preferred. Other hydrophilic monoethylenically unsaturated monomers include hydroxyalkyl esters of both methacrylic acid and acrylic acid such as 2-hydroxyethyl methacrylate, and 2-hydroxypropyl methacrylate. Other hydrophilic unsaturated monomers include the alkyl half esters of itaconic acid, maleic acid and fumaric acid. Preferred half esters are the lower alkyl ($C_1$ to $C_6$) esters such as methyl acid itaconate, butyl acid itaconate, methyl acid fumarate butyl acid fumarate, methyl acid maleate and butyl acid maleate. Such half esters are considered to by "α,β-unsaturated monocarboxylic acids", and the terms as used herein includes such half esters. Still other hydrophylic monomers are the amides, such as acrylamide, methacrylamide, N-methyl acrylamide and N-methylol methacrylamide, hydroxyl containing monomers such as β-hydroxyethyl acrylate, β-hydroxypropyl methacrylate, β-hydroxyethyl methacrylate, β-hydroxypropyl acrylate, and N-hydroxyethyl-acrylamide, and amines such as β-aminoethyl vinyl ether, dimethylaminoethyl acrylate, dimethylaminoethyl methacrylate, dimethylaminoethyl vinyl ether, dimethylaminoethyl vinyl sulfide, and N-(dimethylaminoethyl) acrylamide. It will be noted that the acidic or other hydrophilic monomer contains a carboxyl, amine, amide, or hydroxy group.

Optional monoethylenically unsaturated monomers that may be employed in amounts up to 50% of the total monomers in preparing the water-insoluble addition copolymer include those having the $H_2C=C$-group such as the monovinyl aromatic compounds styrene and vinyl toluene (o, m or p), as well as acrylonitrile, methacrylonitrile, vinyl acetate, vinyl chloride or vinylidene chloride. Such monomers may affect viscosity but do not ordinarily affect the gloss or the molecular weight, and they are thus not essential. Since the pH of the final formulation is alkaline and usually exceeds 7.5, potential hydrolysis of the vinyl ester units is minimized. The term "acrylic polymer" includes products containing such optional monomers in the specified amounts.

In preparing the addition copolymer (A), in the above table, the α,β-monoethylenically unsaturated carboxylic acid portion may vary from 12% to 50%, preferably from about 18% to 25%, based on the total weight of monomers. The coatings on the substrate are readily removable by the application of alkaline media, such as dilute aqueous ammonia. The predominant portion of the hydrophilic monomer is derived from the unsaturated acid, although as pointed out above, other hydrophilic monomers may be included.

The intrinsic viscosity of the addition polymer must range from 0.05 to 0.15 as determined in tetrahydrofuran at 30° C. Control of the molecular weight (in addition to control of the acid level specified) is required in order to obtain the desired high gloss and clarity of the polish formulation. Chain transfer agents are employed in the emulsion polymerization procedure, and can also be utilized in solution polymerization procedures to reduce and control the molecular weight. Suitable chain transfer agents include aliphatic mercaptans, such as n-butyl mercaptan and isopropyl mercaptan, and halogenated hydrocarbons such as trichloromethane, tetrachloromethane, tetrachloroethane, bromotrifluoromethane and butyl chloride. Other satisfactory chain transfer agents are thioglycolic acid, and isopropylbenzene mercaptoethanol. The polymerization conditions must be controlled in such a way that the required intrinsic viscosity is obtained. For example, utilizing bromotrichloromethane as a chain transfer agent, much higher than normal concentrations, for example, 4% to 6% of the agent by weight of the monomers are used. As is described in Jordan et al. U.S. Pat. No. 3,037,952, it is known that the quantity of various chain transfer agents such as those mentioned above may be adjusted to influence molecular weight.

Another polymerization procedure for obtaining the polymers of the invention is similar to that disclosed in U.S. Pat. No. 3,352,806 to Hicks, the disclosed method involving solution polymerization, but with lower solvent concentrations and other differences being used in accordance with the present invention. The method of this invention involves dissolving the monomers in certain water-miscible oxygenated solvents, and conducting the polymerization in the presence of a free radical initiator compatible with the solvent system. Useful solvents are the water soluble, lower ($C_1$–$C_5$ alkyl) monoethers or lower diethers of glycols and diglycols, such as ethylene glycol, propylene glycol, diethylene glycol, dipropylene glycol, and the like. Such ethers and hydroxy ethers are higher boiling materials (e.g., 150°–200° C.), and when they are present in the reaction mixture in amounts of less than 50% preferably about 20% to 30% by weight, and high reaction temperatures (100° C.–175° C.) are utilized, the molecular weight of the resulting polymers may be controlled to obtain the required properties. In lieu of the solvents mentioned above, those water soluble polyhydric alcohols disclosed in the Hicks patent may be utilized. As is pointed out below, these solvents may, if properly chosen, also function as fugitive plasticizers in the formulated polish. The solvent concentration and polymerization temperature must be such as to give the required critical intrinsic viscosity.

Blends of the addition copolymers may be used. The polymers may also be graft copolymers including grafts of the monomers mentioned on shellac. The copolymer containing acid groups may be soluble or dispersible in aqueous alkaline media having a pH from 7.0 to 11, usually at least 7.5, and preferably from about 8.0 to 9.5, the pH being adjusted to achieve a water clear appearance.

The polyvalent metal compound, if employed in the floor polish formulation, may be either a metal complex or a metal chelate. The polyvalent metal ions may be those of beryllium, cadmium, copper, calcium, magnesium, zinc, zirconium, barium, strontium, aluminum, bismuth, antimony, lead, cobalt, iron, nickel or any other polyvalent metal which can be added to the composition by means of an oxide, hydroxide, or basic, acidic, or neutral salt which has appreciable solubility in water, such as at least about 1% by weight therein. The selection of polyvalent metal and the anion are governed by the solubility of the resultant metal complex in order to insure adequate clarity of the final formulated polish. Zinc and cadmium are particularly preferred polyvalent metal ions. The ammonia and amine complexes (and especially those coordinated with $NH_3$) of these metals are particularly useful. Amines capable of so complexing include morpholine, monoethanol amine, diethylaminoethanol, and ethylenediamine. Polyvalent metal complexes (salts) of organic acids that are capable of solubilization in an alkaline pH range may also be employed. Such anions as acetate, glutamates, formate, carbonate, salicylate, glycollate, octoate, benzoate, gluconate, oxalate and lactate are satisfactory. Polyvalent metal chelates where in ligand is a bidentate amino acid such as glycine or alanine may also be employed. The polyvalent metal compound must be such that the metal is available to serve its cross-linking function, i.e., it is dissociable to form polyvalent metal-containing ions.

Preferred polyvalent metal compounds, complexes and chelates include zinc acetate, cadmium acetate, zinc glycinate, cadmium glycinate, zinc carbonate, cadmium carbonate, zinc benzoate, zinc salicylate, zinc glycollate and cadmium glycollate. Although the polyvalent metal compound may be added to the polish composition in dry form such as a powder, it is preferred to first solubilize the polyvalent metal compound using a fugitive ligand such as ammonia. For purposes of this invention a ligand is considered fugitive if at least a portion of said ligand tends to volatilize under normal film forming conditions. Since the ammonia may complex with the polyvalent metal compound, a compound such as zinc glycinate, when solubilized in dilute aqueous ammonia solution, may be named zinc ammine glycinate.

The polyvalent metal compound when used is employed in an amount so that the ratio of polyvalent metal to the $\alpha$-$\beta$-ethylenically unsaturated acid of the addition polymer varies from about 0.05 to 0.5, and preferably from about 0.2 to 0.3. This is expressed as the ratio of metal, such as $Zn^{++}$, to —COOH or —$COONH_4$ groups, a ratio of 0.5 being stoichiometric.

In the compositions of the present invention, the relative proportions of the polymer to wax are from 100:0 to 30:70 by weight. The variation in these relative proportions provides for various buffing characteristics. The amount of an emulsifying or dispersing agent or agents when used in the aqueous polish is generally from 0.1 to 30%, and preferably 1 to 20%, of the combined weights of the copolymer and wax. The concentration of the aqueous dispersion is suitably from 8 to 45% solids and is preferably about 10 to 25% by weight of solids.

The dispersion when finally formulated as a polish composition should have a pH of at least about 7.0 and it may be as high as 10.0 or more. Most advantageously, its pH is from about 8.0 to about 9.5. Suitable alkaline or buffering agents such as borax, sodium hydroxide, ammonia or amines such as diethylamine, triethylamine, morpholine or triethanolamine may be introduced to adjust the pH to the desired value. Sufficient alkaline and/or buffering agent is added at room temperature, (from about 20° C. to about 30° C.) with plasticizers or coalescing agents, to give the polymer dispersion an essentially water-clear appearance.

The copolymer is suitably made by the emulsion copolymerization of the several monomers in the proper proportions using a chain transfer agent, as is pointed out above. Conventional emulsion polymerization techniques are described in U.S. Pat. Nos. 2,754,280 and 2,795,564. Polymerization with a chain transfer agent is described by E. H. Riddle, *Monomeric Acrylic Esters*, pgs. 56–58, Reinhold Publishing Corp., New York, N.Y. 1954. Thus the monomers may be emulsified with an anionic, a cationic, or a nonionic dispersing agent, about 0.5% to 10% thereof being used on the weight of total monomers. The acid monomer is, of course, soluble in water so that the dispersing agent serves to emulsify the other two monomers. A polymerization initiator of the free radical type, such as ammonium or potassium persulfate, may be used alone or in conjunction with an accelerator, such as potassium metabisulfite, or sodium thiosulfate. Organic peroxides, such as benzoyl peroxide and t-butyl hydroperoxide are also useful initiators. The initiator and accelerator, commonly referred to as catalyst, may be used in proportions of 0.1% to 10% each based on the weight of monomers to be copolymerized. The amount, as indicated above, may be adjusted to control the intrinsic viscosity of the polymer. The temperature may be from room temperature to 60° C. or more as is conventional.

Suitable dispersing agents useful in emulsion polymerization include anionic types such as the sodium salts of the higher fatty acid sulfates, such as that of lauryl alcohol, the higher fatty acid salts, such as the oleates or stearates or morpholine, 2-pyrrolidone, triethanolamine or mixed ethanolamines, or any of the nonionic types, such as ethylene oxide-modified alkyl phenols, of which tert-octyl phenol modified by 20 to 40 ethylene oxide units is representative, ethylene oxide-modified higher fatty alcohols such as lauryl alcohol, containing 20 to 50 ethylene oxide units, similarly modified long-chain mercaptans, fatty acids, amines, or the like. Mixtures of nonionic and anionic dispersing agents are also useful.

If the wax (when used) is separately dispersed, the dispersing agents mentioned above may similarly be used, but amine salts of a soap, such as an ethanolamine oleate or stearate, are also quite useful. Suitable homogenizing mills may be used to assist in forming the dispersion.

The waxes or mixtures of waxes which may be used include waxes of a vegetable, animal synthetic, and/or mineral origin, or mixtures thereof, such as carnauba, candelilla, Fischer-Tropsch wax, microcrystalline wax, lanolin, cocoa butter, cottonseed, stearin, Japan wax, bayberry, myrtle, mace, palm kernel, beeswax, spermaceti, Chineses insect, mutton tallow, oxidized polyethylene wax, polyethylene emulsions, polypropylene, copolymers of ethylene and acrylic esters, waxes obtained by the hydrogenation of cocoanut oil or soybeam oils, and the mineral waxes such as paraffin, ceresin, montan, ozokerite, etc. Care should be taken in selecting the wax if water clarity is desired.

Wax-soluble resins or gums may be substituted for up to 50% of the wax, by weight. Natural or synthetic materials, including terpene-phenolic resins, heat processed (run) Congo, wood rosin, oxidized petroleum wax, and the like, are suitable.

The compositions are adapted to form clear glossy coatings. However, if desired, a colored appearance may be obtained by the introduction of water-soluble or oil-soluble dyes in suitable porportions. Examples of suitable dyes which may be used include iron blues, phthlocyanine blues and greens and organic maroons. The amount of dye may be varied widely, depending on the effect desired.

The aqueous dispersions contain, as an essential ingredient, a plasticizer or polymer coalescent to provide a lower temperature of film formation from the polymer dispersions. From 3 to 75% by weight of the plasticizer, based on the weight of copolymer, and wax, wax soluble, and alkali soluble resins when present, is used.

Since the purpose of the plasticizer is usually to facilitate film formation, and since it is not always necessary to impart flexibility to the copolymer composition when it is inherently tough and flexible, as is often the case, a fugitive or semifugitive plasticizer is preferred, rather than a permanent plasticizer. However, permanent plasticizers may be used without the production of films having poor wear-resistance and poor resistance to water. Plasticizers may also serve as an aid in obtaining clarity and improving gloss. Certain plasticizers, such as tributoxyethyl phosphate, serve also as leveling agents. Mixtures of fugitive and permanent plasticizers may also be used. Certain fluorocarbon surfactants also act as leveling agents, and these materials are described in U.S. Pat. No. 2,937,098.

Examples of fugitive plasticizers or coalescents include the monobutyl, monethyl, monomethyl or other monoalkyl ether of diethylene glycol or dipropyleneglycol, isophorone, benzyl, alcohol, diglyme, butyl cellosolve and 3-methoxybutanol-1. Broadly, these materials may be described as water soluble higher boiling (about 150°–200° C.) monohydric and polyhydric alcohols and lower ($C_1$–$C_5$ alkyl) monoethers and diethers of glycols and diglycols. When the polymer is prepared by solution polymerization, as described above, these oxygenated solvents may serve as a fugitive plasticizer in the floor polish composition; i.e., the polymer solution may be simply diluted with ammonia water to the desired solids content. Such fugitive plasticizers are well known, as is shown by the patents cited above.

Examples of essentially permanent plasticizers that are suitable at low levels include benzyl butyl phthalate, dibutyl phthalate, dimethyl phthalate, triphenyl phosphate, 2-ethyl hexyl benzyl phthalate, butyl, cyclohexyl phthalate, mixed benzoic acid. and fatty oil acid esters of pentaerythritol, poly (propylene adipate) debenzoate, diethylene glycol dibenzoate, caprolactam, tetrabutylthiodisuccinate, butyl phthalyl buty glycolate, acetyl tributyl citrate, debenzyl sebacate, tricresyl phosphate, toluene ethyl sulfonamide, the di-2-ethylhexyl ester of hexamethylene glycol diphthalate, di(methylcyclohexyl)phthalate, tributoxyethyl phoshpate, and tributyl phosphate. The particular plasticizer and the amount thereof used are chosen in accordance with the demand for compatibility and efficiency in lowering the film-forming temperature, and polish clarity.

Besides containing the copolymr, the coalescent, a suitable dispersing or emulsifying agent, and the optional wax, metal complex, wax-soluble resin and dye mentioned hereinabove, the composition of the present invention may also contain alkali-soluble resins in an amount of from 0% to 70% of the total weight of the copolymer, wax, wax-soluble resin and alkali-soluble resin. Generally the alkali-soluble resins have acid numbers varying from about 100 to 300 and average number molecular weights ranging from about 500 to about 10,000 and preferably about 800 to 2000.

Examples of alkali-soluble resins include copolymers of styrene or vinyltoluene with at least one α-β-monoethylenically unsaturated acid or anhydride such as styrene-maleic anhydride resins, rosin-maleic anhydride reaction products esterfied with polyhydric alcohols, and alkali-soluble alkyds, which are essentially polyesters of aliphatic dicarboxylic acids with aliphatic polyhydric alcohols which may be modified with $C_8$–$C_{18}$ fatty acids, and glycerol esters of $C_8$–$C_{18}$ fatty acids. Examples of the dicarboxylic acids include maleic, fumaric, adipic, and sebacic acids, including anhydrides thereof. The polyhydric alcohols may be glycerol, pentacrythritol, trimethylolethane, and glycols having 2 to 8 carbon atoms including diethylene glycol and triethylene glycol. Other alkali-soluble resins such as Manila gum, shellac, alkyl acrylate-shellac copolymers containing enough shellac to be alkaki-soluble (see — example 4 of U.S. Pat. No. 3,061,564, to Zdanowski), Loba gum, styrene-acrylic acid or styrene-methacrylic acid coploymers containing for example 50% by weight of each monomer, maleic anhydride copolymerized with an equimolar amount of diisobutylene, and the like.

The concentration of the aqueous dispersion for application purposes may desirably be from 8 to 45% solids and is preferably from about 10 to 25% by weight of solids.

The compositions may be used for impregnating textiles, leather, paper, or other porous or fibrous materials. They may also be applied to plastic sheets such as cellophane, polyethylene, polyethylene glycol terephthalate, saran and the like. They may also be applied to right surfaces, including all sorts of metals such as steel, aluminum, copper, brass, bronze, tin, chromium, and wrought iron, and to wood, stone, masonry, brick, glass, asbestos cement shingles or siding, terrazzo, cement and concrete surfaces such as floors, and so on. The compounds are especially valuable for polishing floors, such as those made of wood, linoleum, rubber, and all sorts of plastic tiles, such as linoleum, asphalt, vinyl, and vinyl-asbestos.

Examples of wetting and dispersing agents which may be added in formulating the polish include alkali metal and amine salts of higher fatty acids having 12 to 18 carbon atoms, such as sodium, potassium, ammonium or morpholine oleate or ricinoleate, as well as the common nonionic surface active agents. Additional wetting agent improves the spreading action of the polish.

For polishing floors, the coating obtained from the composition should have, or develop in a short period of time, a Knoop hardness number of 0.5 to 16 or greater when measured on a film thereof 0.5–2.5 mil thick on glass, as has been mentioned above. This range of hardness provides good resistance to abrasion and wear and can be obtained by the appropriate selection of monomers to be polymerized.

The coalescing agent, addition copolymer and polyvalent metal compound, wax, and/or resin when used may be mixed in any order desired. For example, the wax or resin or both may be introduced into the aqueous polymer dispersion by adding a dispersion of the wax or resin or both to the copolymer dispersion or vice-versa.

The polyvalent metal complex if used may be incorporated into the composition at any time; generally, however, it is the last of the ingredients to be mixed in the formulation.

The compositions have good storage stability under normal conditions of temperature. They may be applied in the usual manner by means of wiping cloths, by brushing, or by means of mops. They dry rapidly to clear or colored films, if pigmented, having hard and tough exceptionally glossy surfaces. There is substantially no discoloration of the films on ageing. The application of the compositions to surfaces carrying previously applied coatings of alkali-removable compositions does not remove appreciable amounts of such coatings nor is the viscosity or consistency of the composition of the present invention detrimentally affected. Hence, the compositions go on the surface uniformly and with ease but without streakiness or other irregularities.

The compositions containing copolymers having carboxylate (acid or salt) groups are removable by alkaline detergents When cross-linking melts are used, the metal cross-linked coating is insoluble in water, ordinary soap solutions and most detergent solutions, and, being soluble in ammonium hydroxide, ammonia solutions are necessary for their removal.

The following analytical method was established to quantitatively define the clarity of the polishing compositions. For purposes of this invention the terms "essentially water-clear" or "substantially clarified" designate the appearance of polishing compositions, containing 15 to 18% solids, having a reading of at least 50% light transmission on a Bausch and Lomb Spectronic 20 Colorimeter that is calibrated to the range of from 0 to 100% with either methanol or distilled water at a wavelength of 600 millimicrons (mu.). The terms "water-clear" or "clarified" designate the appearance of a polishing composition, containing 15 to 18% solids, having a reading of at least 85%.

Gloss of the dried coatings is determined by both subjective visual means and by a Leeds and Northrup Photovolt Glossmeter (Cat. No. 7664) using a 60° head.

"Intrinsic viscosity" as the term is used in the specification and claims, is that obtained in tetrahydrofuran, at 30° C., the units being dl./g.

The following examples, in which the parts and percentages are by weight unless otherwise indicated, are illustrative of the invention.

Although the critical quantity of $\alpha,\beta$-unsaturated acid in the polymer and the critical limited range of low molecular weights are considered to be, to some extent, dependent variables, having a distinct influence upon one another as to gloss and other coating properties, each variable has been found to exert its own influence.

While the preferred methods of obtaining the low molecular weight acrylic polymers are mentioned above and appear in the examples, any method of achieving the proper molecular weight, as evidenced by the specified intrinsic viscosity, may be utilized.

EXAMPLE 1

Effect of Molecular Weight

An emulsion polymer prepared with the following weight percent composition employing 1% sodium lauryl sulfate (by weight based on monomers) as the emulsifier, 5% bromotrichloromethane (BTM) as the chain transfer agent and 0.6% sodium persulfate (both based on monomer weight), as the initiator and an otherwise conventional emulsion polymerization technique.

| Monomer | Percent by Weight |
| --- | --- |
| methyl methacrylate (MMA) | 58 |
| butyl acrylate (BA) | 15 |
| ethyl acrylate (EA) | 15 |
| methacrylic acid (MAA) | 12 |

The resulting polymer dispersion contained 39.3% solids by weight, the yield was 99%, light scatter 26%, and the intrinsic viscosity 0.11 dl/g.

The aqueous dispersion was diluted to 15% solids with water and formulated into polishes using the following materials:

| Ingredient | Amount by Weight |
| --- | --- |
| Polymer Dispersion | 80 |
| Commercial Styrene-maleic anhydride copolymer M.W. 1900 solubilized with NH$_4$OH and diluted to 15% solids | 20 |
| Monoethyl ether of diethylene glycol | 2 |
| Tributoxy ethyl phosphate | 0.8 |
| Monomethyl ether of di-propylene glycol | 4 |
| 2-pyrrolidone | 1 |

The pH was adjusted to 9.2, with ammonium hydroxide to produce a water clear appearance and, using the aforementioned colorimetric method for measuring light transmittance, the water-clear polish formulation gave a reading of 90%.

The gloss performance of this polish was determined by both visual and photometrical techniques and compared to similarly formulated polished derived from emulsions having the identical composition but higher molecular weight. This was done by reducing or eliminating the chain transfer agent BTM during the emulsion polymerization procedure as shown in Table I, columns 2 and 3. In all cases the intrinsic viscosity measurements were determined in tetrahydrofuran (30° C. ) according to the method described earlier. The polishes were then applied to homogeneous vinyl, vinyl asbestos, and linoleum tile samples selected for uniformity, the same coating method and weight being used in each case. The relative gloss, after drying and curing for 56 hours, was determined with a 60° photovolt meter of Leeds and Northrup Manufacture. These results are shown graphically in FIG. 1 and recorded numerically in Table I along with visual observation of gloss performance.

Table I

Effect of Molecular Weight on Glass of Select Water Clear Polishing Compositions

| Polymer Composition | [η] | %BTM | Vinyl Tile | Vinyl Asbestos Tile | Linoleum |
|---|---|---|---|---|---|
| EA/BA/MMA/-MAA | 0.74 | 0 | 3(Fair) | 0(Poor) | 1(Poor) |
| 15/15/58/12 | | | | | |
| 15/15/58/12 | 0.22 | 1 | 3(Fair) | 3(Fair) | 3(Fair) |
| 15/15/58/12 | 0.15 | 3 | 9(VGood) | 8(G-VGood) | 4(F-Good) |
| 15/15/58/12 | 0.11 | 5 | 12(Exc) | 11(Exc) | 4(F-Good) |

It is apparent from these data that lowering the molecular weight of the above polymer composition leads to improved gloss performance on all test substrates, especially vinyl, and vinyl asbestos.

EXAMPLE 2

Following the polymerization procedure and polish formulation procedure of Example 1 except varying amounts of the $\alpha,\beta$-unsaturated acid, and with the pH of the polishes being from 7.9 to 8.8, the following aqueous polymer dispersions were made:

| Run | Monomers Composition BA/MMA/MAA | %BTM | %Polymer Solids |
|---|---|---|---|
| 1 | 20/70/10 | 5 | 25.4 |
| 2 | 20/65/15 | 5 | 25.0 |
| 3 | 20/60/20 | 5 | 25.0 |
| 4 | 20/55/25 | 5 | 25.0 |

Table II

Effect of Increasing Acid Level on Photovolt Gloss Reading

| Run | 4 | 3 | 2 | 1 |
|---|---|---|---|---|
| | 25% MAA | 20% MAA | 15% MAA | 10% MAA |
| | | | | Control |
| Vinyl | 9 | 7 | 0 | 0 |
| Vinyl Asbestos | 10 | 5 | 3 | 0 |
| Linoleum (OTL) | 8 | 4 | 2 | 0 |

All four rums involved low molecular weight polymers, the gloss differences being difficult to evaluate visually. Polymer compositions with acid levels up to 50% were also prepared.

EXAMPLE 3

This example is given in order to compare the solution-polymerized and emulsion-polymerized polymers of the invention (polymer Nos. 3-1 and 3-2 respectively, in the tables below) with one another, and with a higher molecular weight lower acid emulsion polymer (3-3). The details of polymerization and polish formulation, and the performance results are given in Tables III–V.

Table III

Polymer Properties

| Polymer No. | 3-1 | 3-2 | 3-3 Control |
|---|---|---|---|
| Mode of Polymerization | Solution | Emulsion | Emulsion |
| Composition | BA/MMA/MAA | BA/MMA/MAA | BA/MMA/MAA |
| | 20/55/25 | 20/55/25 | 30/60/10 |
| Intrinsic Visc. [η] | 0.088 | 0.10 | 0.25 |
| Solids, % (as made) | 60 | 25 | 40 |
| Monomer Solvent | isobutyl alcohol/ monomethyl ether of dipropylene glycol | $H_2O$ | $H_2O$ |
| Chain Transfer Agent | None | 5% BTM | 1% BTM |
| Reaction Temp. | 110° C. | Reflux | Reflux |
| Catalyst | Benzoyl Peroxide | $Na_2S_2O_8$ | $Na_2S_2O_8$ |
| Soap | None | 1% SLS* | 1% SLS |
| Odor | Pungent | Mild | Mild |
| Appearance | Clear, Water White | Milky, White | Milky, White |

*Sodium lauryl sulfate

Figure 2:
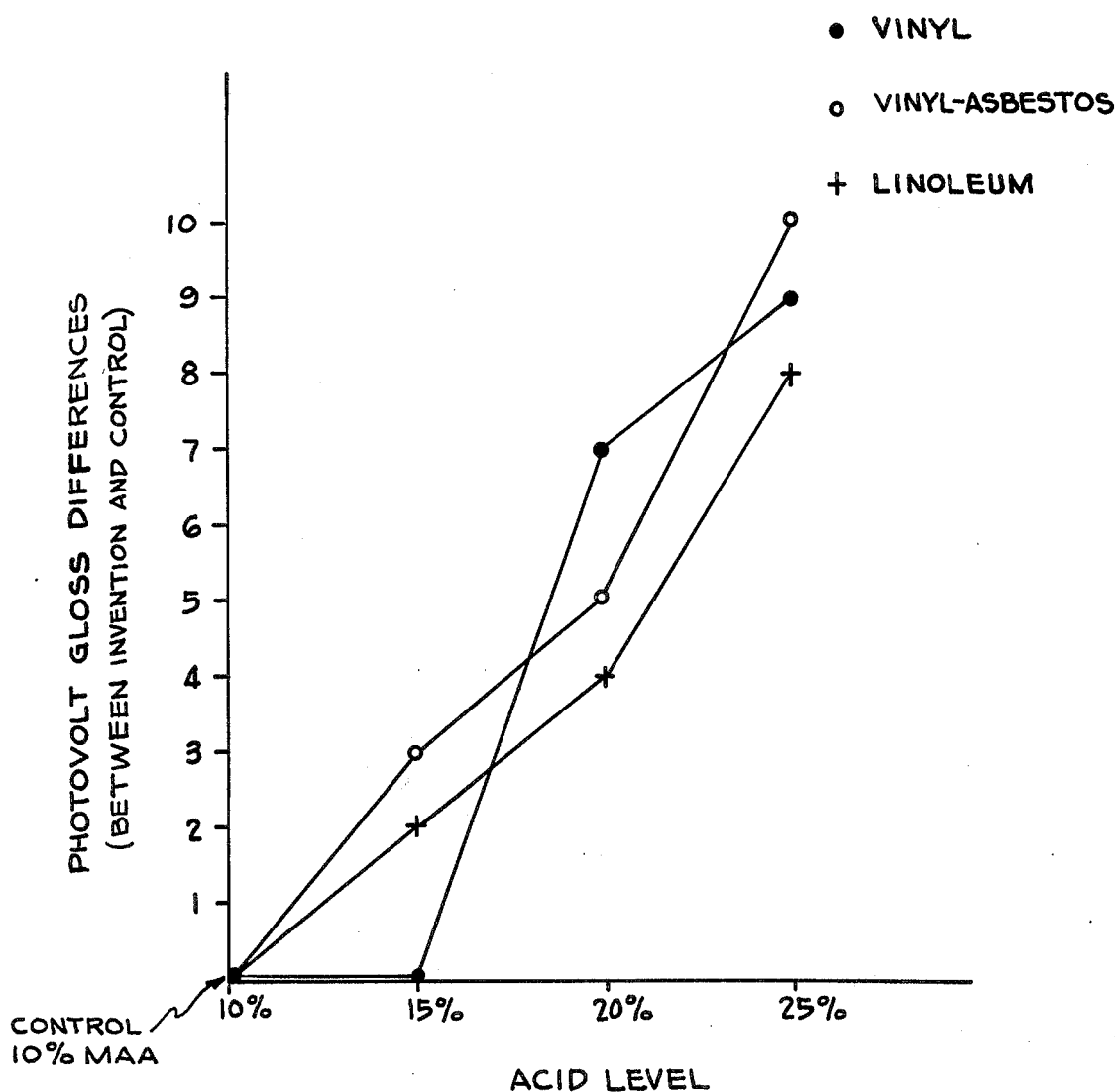
FIG. 2 shows the increasing gloss with increase in copolymerized acid level in the polymer.

The following table gives the results of the polish evaluation, the coatings being formulated and applied in the same manner as in Example 1. FIG. 2 of the drawings shows the results.

The foregoing polymers were formulated into polishes of the compositions shown in Table IV.

Table IV

| Polymer No. | 3-1 | 3-2 | 3-3 Control |
|---|---|---|---|
| Polymer, 15% solids 85% water | 100 | 100 | 100 |
| Monoethyl ether of diethylene glycol | 2 | 2 | 2 |
| Tributoxy ethyl phosphate | 0.8 | 0.8 | 0.8 |
| Monomethyl ether of dipropylene glycol | 5[a] | 5 | 5 |
| 2-pyrrolidone | 1.0 | 1.0 | 1.0 |
| Isobutyl alcohol | 5[a] | — | — |
| pH | Add ammonia or ammonium hydroxide to point of clarity | | |

[a]Introduced as polymerization solvents

Table V

Floor Polish Performance Characteristics:

| Polymer No. | 3-1 | 3-2 | 3-3 Control |
|---|---|---|---|
| Polymer Method | Solution | Emulsion | Emulsion |
| Polish Odor | Pungent | Mild | Ammonial |
| Polish Gloss | | | |
| a. Vinyl | Exc. | Exc. | Fair |
| b. Vinyl Asbestos | Exc. | Exc. | Fair |
| c. Linoleum | Exc. | Exc. | Fair |
| Flow and Leveling | VG | VG | VG |
| Recoatability | Fair | VG | VG |
| Removability, aqueous ammonia | Exc. | Exc. | Good |
| Polish Appearance | Clear, Water White | Clear, Water White | Clear, Water White |

EXAMPLE 4

When zinc glycinate and other polyvalent metal componets described above are combined with the emulsion (3-2) or solution polymers (3-1) of Example 3 in amounts such that the metal: —COOH and/or —COONH$_4$ ratio is from 0.1 to 0.5, substantially the same performance characteristics are obtained but with improved water and alkali resistance, and recoatability.

EXAMPLE 5

An emulsion polymer was prepared with the following weight percent composition employing 1% (based on the total weight of the monomers) of sodium lauryl sulfate as the emulsifer, 2% (based on total weight of monomers) of n-amyl mercaptan as the chain transfer agent and an otherwise conventional polymerization technique.

| Monomer | Percent |
|---|---|
| Butyl acrylate | 20 |
| Methyl methacrylate | 60 |
| 2-Hydroxyethyl methacrylate | 8 |
| Methacrylic acid | 12 |

The final polymer solids of the emulsion was 40% and the intrinsic viscosity was 0.11 in tetrahydrofuran at 20° C. formulation and polish performance properties were essentially the same as described in Example 2, for Runs 2, 3, and 4.

EXAMPLE 6

An emulsion polymer was prepared with the following weight percent composition employing 3% by weight of total monomers of t-octyl phenol modified with an average of 30 ethylene oxide units as the emulsifier, 3% by weight of total monomers of bromotrichloromethane as the chain transfer agent, 250 parts by weight of water, 0.5 parts by weight of potassium metabisulfate and 0.5 parts by weight of potassium persulfate. Polymerization temperature is maintained at 50°–55° C.

| Monomer | Percent |
|---|---|
| Methyl methacrylate | 60 |
| Ethyl acrylate | 25 |
| Itaconic acid | 15 |

The reaction provides approximately a 40% soilds emulsion copolymer and the copolymer had an intrinsic viscosity of 0.15 as measured in tetrahydrofuran at 20° C.

A polishing composition was formulated utilizing this polymer as indicated below.

| | |
|---|---|
| Aqueous polymer dispersion (diluted to 15% solids) | 80 |
| Aqueous alkali-solubilized styrene-maleic anhydride adduct - molecular weight of about 2000 and acid number of 160, 15% solids | 20 |
| Ethylene glycol monomethyl ether | 1 |
| Diethylene glycol monoethyl ether | 2 |
| Tributoxylethyl phosphate | 0.8 |
| Monomethyl ether of dipropylene glycol | 4 |
| n-Methyl-2-pyrrolidone | 1 |
| pH | 9.0 |

The polish was essentially clear, a transmittance of 85% being otained using the above-described colorimetric method for measuring light transmittance. The polish was evaluated and its gloss was outstanding.

EXAMPLE 7

A solution polymer, containing 75% of the following monomers and 25% of the water miscible solvent monomethyl ether of dipropylene glycol, was prepared using dicumly peroxide initiator. The reaction temperature was maintained at 160° C. over a 3 hour reaction period.

| | |
|---|---|
| Styrene | 30 |
| Ethyl acrylate | 40 |
| Methacrylic acid | 30 |

The resultant polymer was diluted to 15 percent solids using stoichiometric ammonial H$_2$O solution. The intrinsic viscosity of the solution polymer measured in tetrahydrofuran was less than 0.1.

The diluted polymer solution was formulation as indicated below.

| | |
|---|---|
| Polymer, 15% | 100 |
| Diethylene glycol monoethyl ether | 3 |
| Tributoxyl ethyl phosphate | 1 |
| Fluorinated hydrocarbon surfactant, C$_8$F$_{17}$SO$_2$N(C$_2$H$_5$)CH$_2$COOK | 0.5 |
| pH | 8.5 |
| % Transmittance | 90 |

The gloss of the above polish formulation was significantly higher than the high molecular weight low acid polymer (3-3) based polish control in Example 3.

EXAMPLE 8

An emulsion polymer prepared with the following weight percent composition employing 1% sodium lauryl sulfate (by weight based on monomers) as the emulsifier, 4 percent bromotrichloromethane as the chain transfer agent and 0.8% sodium persulfate (both based on monomers) as the initiator and an otherwise conventional emulsion polymerization technique.

| Monomer | Percent by Weight |
| --- | --- |
| Butyl acrylate | 30 |
| Methyl Methacrylate | 45 |
| Methacrylic acid | 25 |

The resulting dispersions contained 40% solids by weight and the intrinsic viscosity was 0.13.

The aqueous dispersion was diluted to 15% solids with water and formulated with a commercial emulsifiable lower molecular weight polyethylene emulsified as follows.

| Wax Formulation | Parts by Weight |
| --- | --- |
| Polyethylene | 72.5 |
| Triton X-100 | 22.5 |
| KOH | 5.5 |
| $NA_2S_2O_5$ | 0.7 |
| $H_2O$ to 15% solids | |
| Polish Formulation | |
| Polymer dispersion, 15% solids | 95 |
| Wax emulsion, above, 15% solids | 5 |
| Diethylene glycol monomethyl ether | 2 |
| Dipropylene glycol monomethyl ether | 4 |
| Tributoxy ethyl phosphate | 0.8 |
| 2-Pyrrolidone | 1.0 |
| pH | 8.8 |
| % Transmittance | 85 |

The gloss performance was outstanding.

Heretofore in the specification the polish composition has been variously referred to as comprising a dispersion or a solution of the water insoluble addition polymer of the specified intrinsic viscosity and carboxylic acid content. It is believed that the polish, although water clear and having the appearance of a solution, is in fact a colloid-like dispersion of discrete polymer particles which (by the addition of sufficient ammonia or other alkaline material and the addition of organic solvents or coalescing agents which are water soluble to the aqueous dispersion) are modified in such a way that the refractive index of these discrete particles approximately matches the refractive index of water, all as is discussed in "Resin Review", Vol. 18, No. 2, pp. 12–16 (1968). Such hypothesis and theories as are presented herein are for the purpose of furthering the understanding of the invention by those skilled in the art, and unless so specified, it is not intended that the invention be limited thereto.

We claim:

1. A method of polishing wood, linoleum, asphalt, vinyl, and vinyl asbestos flooring, with a high gloss coating having a Knoop hardness number of at least 0.5. comprising the steps of applying thereto a layer of a polymeric composition having an essentially water-clear appearance and containing alkaline or buffering agents, a salt of a water-insoluble addition polymer having carboxyl groups, a surface active agent, water, and optional ingredients, in which said addition polymer consists essentially of an addition polymer of monomers consisting essentially of from 12% of about 25% by weight of an $\alpha,\beta$-unsaturated carboxylic acid interpolymerized with an ester of acrylic acid or methacrylic acid, which polymer contains no more than about 10% of an additional copolymerizable hydrophilic property-conferring monomer having hydroxyl, amide, or amine groups, said polymer having an intrinsic viscosity, at 30° C. in tetrahydrofuran, of between 0.05 and 0.15, and in which a water miscible coalescing agent or plasticizer is present in an amount between about 3% and 75%, based on the combined weights of the acrylic polymer, and any wax, wax-soluble polymer, or alkali-soluble polymer present, there being 30 to 100 parts by weight addition polymer and 0 to 70 parts by weight of wax, wax-soluble resin, or alkali-soluble resin, the total of addition polymer and the wax, wax-soluble, or alkali-soluble resin being 100 parts, and drying the coating, the coating being removable with aqueous ammonia, there being no more than about 50% of other monoethylenically unsaturated monomers in the polymer, the total solids content being from about 8% to 45% by weight.

2. The method of claim 1 in which said composition has a pH of 8.0 to 9.5 and contains from 0 to 70 parts, per 100 parts of acrylic polymer, of one or more of a wax, a wax together with a wax-soluble resin, or an alkali-soluble resin, said acid is acrylic acid or methacrylic acid present in said monomers in an amount up to about 20% by weight and in which up to about 10% of an additional copolymerizable hydrophilic property-conferring monomer having hydroxyl, amide, or amine groups is utilized in preparing said polymer, the remaining monomers comprising at least one hydrophobic $\alpha,\beta$-unsaturated ester of acrylic acid or methacrylic acid and an alcohol, the solids content being less than 25% by weight.

3. The method of claim 1 in which said polishing composition has a pH of at least 7.5, contains from 0 to 70 parts, per 100 parts of acrylic polymer, of one or more of a wax, a wax and a wax-soluble resin, or an alkali-soluble resin, said acid is acrylic acid or methacrylic acid, which makes up at least about 18% by weight of said monomers, the remaining monomers comprise at least one hydrophobic ester of acrylic acid or methacrylic acid and an alcohol, and in which said composition comprises a polyvalent metal compound dissociable in the composition to form polyvalent metal-containing ions, the solids content being less than about 25%.

4. The method of claim 2 in which said monomers consist essentially of methacrylic acid, buty acrylate, methyl methacrylate, and said monomer which confers hydrophilic properties upon said polymer.

5. The method of claim 3 in which said monomes consist essentially of one or more alkly acrylates or methacrylates, the alkyl group having from 1 to 8 carbon atoms, and methyl methacrylate.

6. In a method of polishing wood, linoleum, asphalt, vinyl, and vinyl asbestos flooring, said composition being capable of forming a high gloss coating film having a Knoop hardness number of at least 0.5, the steps of dissolving monomers consisting essentially of from about 15% to about 25% by weight of an β,β-unsaturated carboxylic acid and at least one ester of acrylic acid or methacrylic acid and up to 50% of other monoethylenically unsaturated monomers, which mmonomers contain no more than about 10% of an additional copolymerizable hydrophilic property-conferring monomer having hydroxyl, amide or amine groups, in a water-miscible higher boiling oxygenated solvent selected from monohydric and polyhydric alcohols and hydroxy ethers, polymerizing said monomers at a temperature of from 100° C. to 175° C. by means of a free-radical initiator under conditions such that a polymer having an intrinsic viscosity, at 30° C. in tetrahydrofuran, of between 0.05 and 0.15 is obtained, and mixing the resulting polymer and solvent with water, said solvent being present in the mixture in an amount between about 3% and 75% based on the combined weights of the acrylic polymer and any wax, was-soluble resin, or alkali-soluble resin, there being 30 to 100 parts by weight of addition polymer and 0 to 70 parts by weight of wax, wax-soluble resin, or alkali-soluble resin, the total of addition polymer and the wax, wax-soluble, or alkali-soluble resin being 100 parts, with an alkaline agent or buffering agent in an amount to give the dispersion a pH of at least about 7.5 and an essentially water-clear appearance, all of said meterials being at a temperature of from about 20° C. to 25° C., applying a coating of said composition to said flooring and drying the coating at ambient temperature, the coating being removable by aqueous ammonia, the solids content of the coating composition being from about 8% to 25% by weight.

7. The method of claim 6 including the step of mixing from 0 to 70 parts, per 100 parts of acrylic polymer, of one or more of a wax, a wax and a wax-soluble resin, or an alkali-soluble resin with said polishing composition, in which said acid is acrylic acid or methacrylic acid present in said monomers in an amount of from about 15% to about 20% by weight, in which up to about 10% by weight of an additional acrylic monomer which contains a carboxyl, amine, amide, or hydroxyl group which confers hydrophilic properties upon the polymer is utilized in preparing said polymer, and including in said composition a polyvalent metal compound dissociable in the composition to form polyvalent metal-containing ions.

8. The method of claim 7 in which said acid is methacrylic acid and in which the reaction mixture from the polymerization step contains about 20% to 50% of said oxygenated solvent.

9. The method of claim 6 incuding the step of mixing from 0 to 70 parts, per 100 parts of acrylic polymer, of one or more of a wax, a wax and a wax-soluble resin, or an alkali-soluble resin with said polishing composition, in which said acid is acrylic acid or alower alkyl substituted acrylic acid present in said monomers in an amount of at least about 18% by weight of said monomers, and including in said composition a polyvalent metal compound dissociable in the composition to form polyvalent metal-containing ions.

10. The method of claim 9 in which said monomers consist essentially of methacrylic acid, butyl acrylate and methyl methacrylate.

11. In a method of polishing wood, linoleum, asphalt, vinyl, and vinyl asbestos flooring, said composition being capable of forming a high gloss coating film having a Knoop hardness number of at least 05, the steps of emulsifying acrylic monomers comprising from about 15% to about 25% by weight of an α,β-unsaturated monocarboxylic acid and an ester of acrylic said or methacrylic acid and up to 50% of other monoethylenically unsaturated monomers, which monomers contain no more than about 10% of an additional copolymerizable hydrophilic property-conferring monomer having hydroxyl, amides, or amine groups, in an aqueous medium containing a surface-active agent, a free-radical initiator and a chain transfer agent, and causing interpolymerization of said monomers, the quantity of chain transfer agent and the polymerization conditions being such that a polymer having an intrinsic viscosity, in tetrahydrofuran at 30° C., of between about 0.05 and about 0.15 is obtained, and mixing the resulting polymer dispersion at room temperature with a coalescing agent and an alkaline agent or buffering agent in an amount to give an essentially water-clear appearance, a pH of at least about 7.5, and a solids content of about 8% to 25% by weight, said coalescing agent being present in the mixture in an amount between about 3% and 75%, based on the combined weights of the acrylic polymer and any wax, wax-soluble resin, or alkali-soluble resin, there being 30 to 100 parts by weight of addition polymer and 0 to 70 parts by weight of wax, wax-soluble resin, or alkali-soluble resin, the total of addition polymer and the wax, wax-soluble, or alkali-soluble resin being 100 parts, applying a coating of the composition to said flooring, and drying the coating at ambient temperature, the coating being removable by aqueous ammonia.

12. The method of claim 11 including the step of mixing from 0 to 70 parts, per 100 parts of acrylic polymer, of one or more of a wax, a wax and wax-soluble resin, or an alkali-soluble resin with said polishing composition, in which said acid is acrylic acid or methacrylic acid present in said monomers in an amount of from about 15% to about 20% by weight, in which up to about 10% by weight of an additional acrylic monomer having an amine, amide, hydroxyl or carboxyl group whichh confers hydrophilic properties upon the polymer is utilized in preparing said polymer, and including in said composition a polyvalent metal compound dissociable in said composition to form polyvalent metal-containing ions.

13. The method of claim 12 in which said hydrophobic ester consists essentially of a combination of butyl acrylate and methyl methacrylate.

14. The method of claim 11 including the step of mixing from 0 to 70 parts, per 100 parts of acylic polymer, of one or more of a wax, a wax and a wax-soluble resin, or an alkali-soluble resin with said polishing composition, in which said acid is acrylic acid or methacrylic acid present in said monomers in an amount of at least about 18% by weight of said mononers, and including in said composition a polyvalent metal compound dissociable in said composition to form polyvalent metal-containing ions.

15. The method of claim 14 in which said monomers consist essentially of methacrylic acid, butyl acrylate and methyl methacrylate.

16. An article of manufacture containing the dry, glossy, coating applied by the method of claim 1, and of the composition of claim 1, which coating is removable with aqueous ammonia.

* * * * *

UNITED STATES PATENT AND TRADEMARK OFFICE
CERTIFICATE OF CORRECTION

PATENT NO. : 4,017,662
DATED : April 12, 1977
INVENTOR(S) : D. R. Gehman, I. S. Fiarman It is certified that error appears in the above-identified patent and that said Letters Patent are hereby corrected as shown below:

Column 2, line 42, before "Fig. I" insert
--BRIEF DESCRIPTION OF THE DRAWING--

--The following description of the invention will be better understood by having reference to the annexed drawing, wherein:--

Column 3, line 51, "by" should be --be--.

Column 8, line 4, "buty" should be --butyl--.

Column 11, line 8, "Glass" should be --Gloss--.

Column 12, line 26 "rums" should be --runs--.

Column 14, line 37 "otained" should be --obtained--.

Column 14, line 45, "dicumly" should be --dicumyl--.

Column 14, line 58, "formulation" should be --formulated--.

Column 16, line 60, "monomes" should be --monomers--.

Column 17, line 1, "$\beta,\beta$" should be --$\alpha,\beta$--.

Column 17, line 18, "was-soluble" should be --wax-soluble--.

UNITED STATES PATENT OFFICE
CERTIFICATE OF CORRECTION

Patent No. 4,017,662           Dated April 12, 1977

Inventor(s) David R. Gehman et al.

It is certified that error appears in the above-identified patent and that said Letters Patent are hereby corrected as shown below:

Column 18, line 1, "05" should be -- 0.5 --.

Signed and Sealed this

Sixth Day of September 1977

[SEAL]

Attest:

RUTH C. MASON
*Attesting Officer*

LUTRELLE F. PARKER
*Acting Commissioner of Patents and Trademarks*